United States Patent
Zhang et al.

(10) Patent No.: US 11,232,546 B2
(45) Date of Patent: Jan. 25, 2022

(54) TEXTURE DETECTION METHOD, TEXTURE IMAGE COMPENSATION METHOD AND DEVICE, AND ELECTRONIC DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Na Zhang, Beijing (CN); Bin Zhang, Beijing (CN); Jing Wang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 16/632,975

(22) PCT Filed: Aug. 5, 2019

(86) PCT No.: PCT/CN2019/099254
§ 371 (c)(1),
(2) Date: Jan. 22, 2020

(87) PCT Pub. No.: WO2020/063111
PCT Pub. Date: Apr. 2, 2020

(65) Prior Publication Data
US 2021/0264575 A1    Aug. 26, 2021

(30) Foreign Application Priority Data

Sep. 29, 2018 (CN) .......................... 201811148568.2

(51) Int. Cl.
*G06T 5/00* (2006.01)
*G06T 7/90* (2017.01)
(Continued)

(52) U.S. Cl.
CPC .......... *G06T 5/005* (2013.01); *G06K 9/00013* (2013.01); *G06T 5/20* (2013.01); *G06T 7/40* (2013.01); *G06T 7/90* (2017.01)

(58) Field of Classification Search
CPC .. G06T 5/005; G06T 7/90; G06T 5/20; G06T 7/40; G06K 9/00013
See application file for complete search history.

(56) References Cited

U.S. PATENT DOCUMENTS

2005/0100200 A1* 5/2005 Abiko ................ G06K 9/00026
382/124
2014/0071295 A1   3/2014 Miesak
(Continued)

FOREIGN PATENT DOCUMENTS

CN       106485237 A      3/2017
CN       106548129 A      3/2017
(Continued)

*Primary Examiner* — Utpal D Shah
(74) *Attorney, Agent, or Firm* — Dilworth & Barrese, LLP.; Michael J. Musella, Esq.

(57) ABSTRACT

A texture image compensation method, a texture detection method and a device, and an electronic device are provided. The texture detection method includes: performing an image difference calculation on a first texture image acquired by a texture detection device and a foreign object correction image acquired by the texture detection device to compensate foreign object information in the first texture image, and to acquire a second texture image; performing and the texture detection by using the second texture image.

14 Claims, 5 Drawing Sheets

(51) Int. Cl.
*G06K 9/00* (2006.01)
*G06T 5/20* (2006.01)
*G06T 7/40* (2017.01)

(56) References Cited

U.S. PATENT DOCUMENTS

2019/0251393 A1* 8/2019 Jiang ................ G06K 9/00087
2020/0050828 A1* 2/2020 Li ............................ G06T 5/002

FOREIGN PATENT DOCUMENTS

| CN | 108288050 A | 7/2018 | |
| CN | 109389071 A | 2/2019 | |
| WO | WO-2018077104 A1 * | 5/2018 | ......... G06K 9/00087 |

* cited by examiner

TEXTURE DETECTION METHOD, TEXTURE IMAGE COMPENSATION METHOD AND DEVICE, AND ELECTRONIC DEVICE

CROSS REFERENCE TO RELATED APPLICATIONS

The present application claims priority of Chinese Patent Application No. 201811148568.2, filed on Sep. 29, 2018, the disclosure of which is incorporated herein by reference in its entirety as part of the present application.

TECHNICAL FIELD

Embodiments of the present disclosure relate to a texture detection method and a texture detection device, a texture image compensation method and a texture image compensation device, and an electronic device.

BACKGROUND

Due to the uniqueness of skin texture such as a fingerprint pattern or a palmprint pattern, texture detection has become an important verification method for electronic devices. Generally speaking, a texture detection device is provided independently, for example, the texture detection device is arranged at a side of a display region of a mobile terminal or a tablet computer. However, this arrangement is not conducive to reduce the volume of the mobile terminal or the tablet computer, or to realize a narrow frame design. Therefore, more and more under-screen texture detection solutions for mobile terminals or tablet computers have been proposed by the industry nowadays. A common under-screen texture detection method involves the under-screen texture detection based on an optical detection.

SUMMARY

At least one embodiment of the present disclosure provides a texture image compensation method, which includes: performing an image difference calculation on a first fingerprint image acquired by a fingerprint detection device and a foreign object correction image acquired by the fingerprint detection device to compensate foreign object information in the first texture image, and to acquire a second texture image.

For example, in a texture image compensation method provided by an embodiment of the present disclosure, performing the image difference calculation on the first texture image and the foreign object correction image, includes: performing a grayscale processing on the first texture image; and performing the image difference calculation on the foreign object correction image and the first texture image that have been subjected to the grayscale processing.

For example, in a texture image compensation method provided by an embodiment of the present disclosure, performing the image difference calculation on the foreign object correction image and the first texture image that have been subjected to the grayscale processing, includes: performing a grayscale difference calculation on the foreign object correction image and the first texture image that have been subjected to the grayscale processing.

For example, in a texture image compensation method provided by an embodiment of the present disclosure, an acquisition method of the foreign object correction image, includes: in a case where no texture is entered, colleting an initial image of a texture entering region; and acquiring the foreign object correction image from the initial image, wherein the foreign object correction image comprises the foreign object information of the texture entering region.

For example, in a texture image compensation method provided by an embodiment of the present disclosure, acquiring the foreign object correction image from the initial image, includes: performing a grayscale processing on the initial image to acquire the foreign object correction image.

For example, in a texture image compensation method provided by an embodiment of the present disclosure, after acquiring the foreign object correction image, further including: storing the foreign object correction image.

For example, in a texture image compensation method provided by an embodiment of the present disclosure, the foreign object information includes scratch information.

For example, in a texture image compensation method provided by an embodiment of the present disclosure, the texture image comprises a fingerprint image.

At least one embodiment of the present disclosure provides a texture detection method, which includes: acquiring the second texture image by any one of the texture image compensation method, which is described above; and performing a texture detection by using the second texture image.

For example, in a texture detection method provided by an embodiment of the present disclosure, performing the texture detection by using the second texture image, includes: performing a feature extraction on the second texture image to acquire a texture template, and comparing the texture template with a pre-stored texture template in a texture library to determine whether the texture detection is passed.

For example, a texture detection method provided by an embodiment of the present disclosure further includes: after passing the texture detection, a preset operation is allowed to be executed.

At least one embodiment of the present disclosure provides a method of acquiring a foreign object correction image of a fingerprint detection device, which includes: in a case where no fingerprint is entered, collecting an initial image of a fingerprint entering region by the fingerprint sensor; and acquiring a foreign object correction image from the initial image, wherein the foreign object correction image comprises foreign object information of the fingerprint entering region.

For example, in a method of acquiring a foreign object correction image of a fingerprint detection device provided by an embodiment of the present disclosure, acquiring the foreign object correction image from the initial image, includes: performing a grayscale processing on the initial image to acquire the foreign object correction image.

For example, a method of acquiring a foreign object correction image of a fingerprint detection device provided by an embodiment of the present disclosure, after acquiring the foreign object correction image from the initial image, further includes: storing the foreign object correction image.

At least one embodiment of the present disclosure provides a texture detection device, which includes: a texture sensor, configured to collect a texture image; and an acquisition module, configured to perform an image difference calculation on a first texture image acquired by the texture sensor and a foreign object correction image acquired by the texture sensor to compensate foreign object information in the first texture image, and to acquire a second texture image.

For example, a texture detection device provided by an embodiment of the present disclosure further includes: a detection module, configured to perform a texture detection on the second texture image.

At least one embodiment of the present disclosure provides a texture detection device, which includes: a texture sensor, configured to collect a texture image; a processor; and a memory, in which computer-executable instructions are stored, wherein in a case where the computer-executable instructions are loaded and executed by the processor, the processor executes the texture image compensation method, which described above, or executes the texture detection method, which described above, or executes the method of acquiring the foreign object correction image of the fingerprint detection device, which described above.

For example, in an electronic device provided by an embodiment of the present disclosure, the memory further stores a foreign object correction image.

At least one embodiment of the present disclosure provides an electronic device, which includes: the texture detection device provided by an embodiment of the present disclosure and the texture detection device provided by an embodiment of the present disclosure.

For example, in an electronic device provided by an embodiment of the present disclosure, the electronic device is a display device, and includes a display panel, the texture senor is provided at a non-display side of the display panel, and overlaps with the texture detection region in a direction perpendicular to the display panel.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make the objects, technical schemes and advantages of the present disclosure more clear, the technical scheme of the embodiments of the present disclosure will be clearly and completely describe in conjunction with the accompanying drawings of the embodiments of the present disclosure. Obviously, described embodiments are part of the embodiments of the present disclosure, not all of the embodiments. Based on the described embodiments of the present disclosure, all of other embodiments acquired by those skilled in the art without the need for creative work are fall within the scope of the protection of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the present disclosure, textures include fingerprints or palm prints, etc., and the embodiments of the present disclosure will hereinafter take fingerprints as examples to explain the technical solutions of the embodiments of the present disclosure in detail. Moreover, an operating body with textures may be a hand, thus corresponding textures to be recognized are skin textures, such as fingerprints, palm prints, etc. In addition, an operating body with textures may also be a non-living body with certain textures, such as an object with certain textures made of a material, such as resin, and the embodiments of the present disclosure are not specifically limited to the above.

Figure 1:
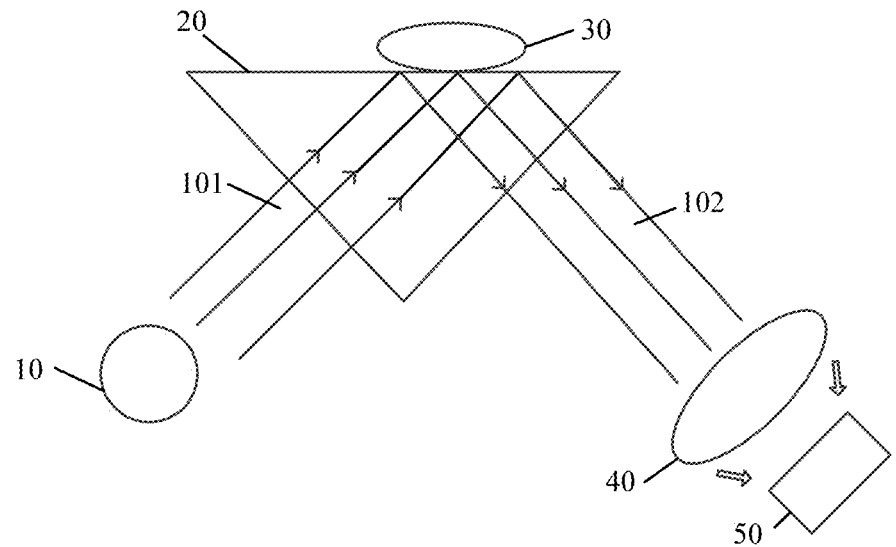
FIG. 1 is a schematic diagram of the principle of under-screen fingerprint detection based on optical detection.

FIG. 1 is a schematic diagram of the principle of under-screen fingerprint detection based on optical detection. A light source 10 and a transmission lens 40 are respectively provided at the same side of an optical substrate 20, and a fingerprint sensor 50 is provided at an imaging side of the optical lens 40. When fingerprint detection is performed, a user's finger 30 is pressed upon the surface of the optical substrate, incident light 101 from the light source 10 is irradiated the surface of the finger to generate reflected light 102, and the reflected light 102 is incident upon the fingerprint sensor 50 through the optical lens 40. The fingerprint sensor 50 collects the fingerprint image of the finger by receiving the reflected light 102, and outputs a data signal of the fingerprint image to a fingerprint detection processor, so that the fingerprint detection processor performs the fingerprint detection. Here, the optical lens 40 may not be provided according to requirements, and in this case the fingerprint sensor 50 may directly receive the reflected light 102 to image the fingerprint. For example, the fingerprint sensor 50 is an optical fingerprint sensor. The light source, which is described above, for example, emits visible light or infrared light for the fingerprint detection, and accordingly, the optical fingerprint sensor may be a visible light image sensor or an infrared light image sensor, such as a charge coupled device (CCD) type image sensor or a complementary metal oxide semiconductor (CMOS) type image sensor, etc. The type, the structure, etc., of the optical fingerprint sensor are not specifically limited in the present disclosure.

Based on the principle of the under-screen fingerprint recognition in FIG. 1, a current under-screen fingerprint detection solution usually uses the light for the display operation emitted by the display panel itself as the light source, and uses the screen surface of the display panel as the optical substrate. The fingerprint sensor is usually provided at a back side of the display panel, or is integrated in a functional layer of the display panel, thus realizing an under-screen fingerprint detection function. The under-screen fingerprint detection method can be applied to an Organic Light-Emitting Diode (OLED) display panel, such as a flexible OLED display panel, and a quantum dot light-emitting diode (QLED) display panel. The OLED display panel has self-luminous characteristics, and its light emission can be controlled or modulated according to requirements, which can provide convenience for fingerprint image acquisition, and help to improve an integration level of an electronic device.

Figure 2A:
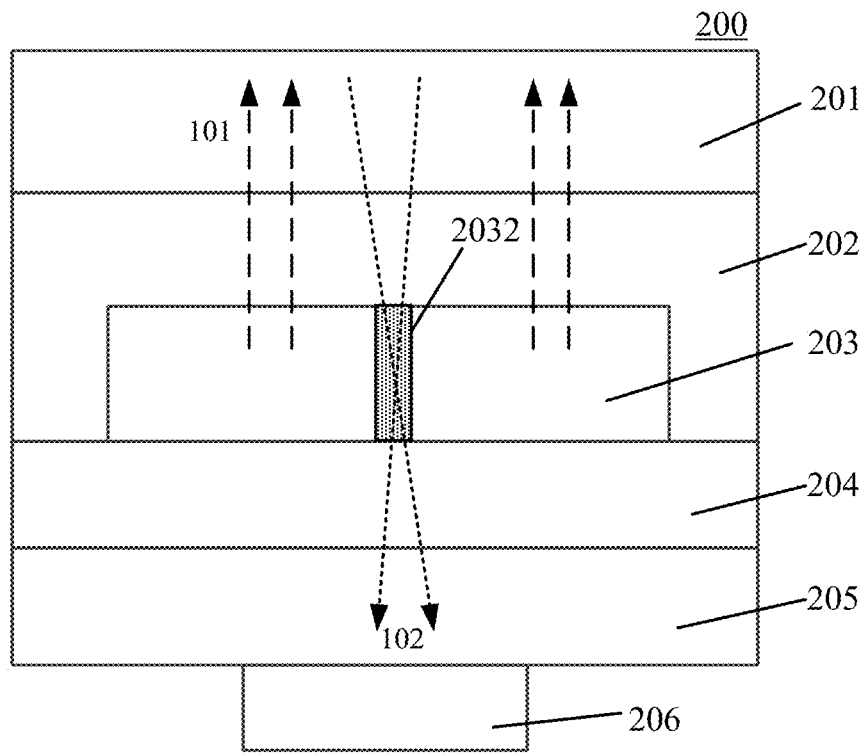
FIG. 2A is a schematic diagram of an OLED display panel with an under-screen fingerprint detection function.

FIG. 2A is a schematic diagram of an OLED display panel with an under-screen fingerprint detection function. As shown in FIG. 2A, the OLED display panel 200 includes a top layer film 201, a thin film encapsulation 202, a pixel unit array 203, a flexible substrate 204, and a bottom layer film 205.

The bottom layer film 205 provides a protection and supporting function for other structural and functional layers located thereon, and may be such as a plastic substrate or a glass substrate with higher strength. The flexible substrate 204 is configured to provide buffering, and for example, may be a flexible substrate made of polyimide (PI), polypropylene (PP), polycarbonate (PC), etc.

The pixel unit array 203 is formed on the flexible substrate 204, and includes a plurality of pixel units arranged in a predetermined array, and signal lines (including gate lines, data lines, detection lines, etc.) configured to supply electrical signals (including scanning signals, data signals, detection signals, etc.). Each pixel unit includes an OLED, a pixel drive circuit configured to drive the OLED to emit light, etc. Light 101 emitted by the pixel unit is used for display, and used as the incident light for the under-screen fingerprint detection.

The thin film encapsulation 202 covers the pixel unit array 203 to prevent external water vapor from entering the pixel unit array 203 to cause aging or deterioration therefor, and may be a multi-layer thin film encapsulation which includes, for example, laminated inorganic insulating layers, organic insulating layers, etc.

The top layer film 201 may be a cover plate, such as a substrate or a thick film made of glass or plastic, and is configured to provide supporting and protection, such as provided for the user to perform an operation of touch, etc.

A fingerprint sensor 206, which collects fingerprint images, is disposed (for example, attached by an optically clear adhesive (COA)) on a side of the bottom layer film 205, which is away from the pixel unit array 203 (for example, the lower side in the drawing), and the fingerprint sensor 206 is configured to detect light 102 for fingerprint detection, which is reflected from the surface side of the top layer film 201. The fingerprint sensor 206 has a certain area, and includes a plurality of pixel units arranged in a predetermined array. The fingerprint sensor 206, for example, is coupled to a fingerprint detection processor (for example, an integrated circuit chip) through leads, so that collected fingerprint images can be transmitted to the fingerprint detection processor in a form of data signals. As described above, the fingerprint sensor 206 may be a fingerprint sensor of any suitable type such as a charge coupled device (CCD) type image sensor or a complementary metal oxide semiconductor (CMOS) type image sensor.

According to the requirements, the OLED display panel 200 may further include other structural or functional layer(s). For example, the OLED display panel 200 may include a touch structure, which is configured to realize a touch function. The touch structure may be built within the pixel unit array 203, or formed on the top layer film, etc., and for example, may be of a capacitive type, a resistive type, etc.

In order to realize the under-screen fingerprint detection function, the top layer film 201, the film encapsulation 202, the flexible substrate 204, and the bottom layer film 205 are at least partially transparent, and small holes 2032 are formed between adjacent pixel units in the pixel unit array 203, so that light reflected from the fingerprint on the surface of the top layer film 201 can be incident on the fingerprint sensor 206, and is imaged through the small holes to obtain a fingerprint image. For example, the OLED display panel 200 may include a micro-lens array (not shown in the figure), and the micro-lens array, for example, is formed corresponding to the small holes 2032, which is described above. According to the formation position of the micro-lens array, the light 102, which passes through the small hole 2032, is collimated, or the light 102, after passing through the small hole 2032, is collimated, and the light 102, which is collimated, is incident on the fingerprint sensor 206. The micro-lens array corresponds to the transmission lens 40 in FIG. 1.

Figure 2B:
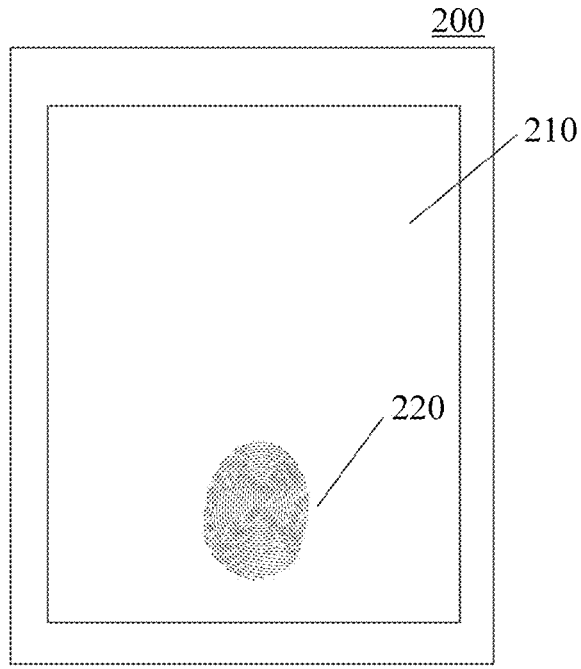
FIG. 2B is a schematic plane view of an OLED display panel with an under-screen fingerprint detection function.

A schematic plane view of the OLED display panel 200 is shown in FIG. 2B. The OLED display panel 200 includes a display region 210, and the display region 210 includes a fingerprint recognition region 220. The region around the display region 210 is a peripheral region, such as the border region of the display panel. The fingerprint recognition region 220 is at least part of a predetermined region in the display region 210, and the fingerprint sensor 206 is arranged at a position corresponding to the predetermined region. If the fingerprint recognition is required, a user places the finger in the fingerprint detection region 220, and the pixel units in the display region are in a display state (or a light emitting state) at this time. The light is irradiated on the finger surface, and the reflected light reflected from the finger surface is incident on the fingerprint sensor 206 on the back side of the display panel, thereby realizing the fingerprint detection function.

However, in the OLED display panel, which is described above, with the under-screen fingerprint detection function, the fingerprint detection result is easily affected by a foreign object on the structure or the functional layer of the display panel. The foreign object include, for example, a scratch on the bottom surface of the bottom layer film 205 (for example, the surface away from the pixel unit array layer 203 in the figure), an adhered particle, a foreign object appearing in the functional layer, etc. The foreign object is located on the transmission path of the incident light detected by the fingerprint sensor 206 (that is, the light reflected from the finger surface), thus adversely affecting the fingerprint image collected by the fingerprint sensor 206, and affecting the accuracy and precision of fingerprint detection.

The foreign object, which is described above, may be generated due to many reasons. For example, the scratch on the bottom surface of the bottom layer film 205 is usually generated during the manufacture process of the OLED display panel. Generally, the manufacture process of the OLED display panel includes the following operations. Firstly, a bottom layer film is formed on a support substrate, and a flexible substrate is deposited on the bottom layer film, a pixel unit array is manufactured on the flexible substrate by a semiconductor processing (including a film deposition processing, a patterning processing, etc.), and then a film encapsulation, a top layer film, etc. are formed. Secondly, the structural and functional layers including the bottom layer film, etc., are peeled off from the support substrate by a laser peeling processing. Then, a fingerprint sensor is disposed on the bottom surface of the bottom layer film. In the manufacture process of the OLED display panel, in order to complete the different manufacture processes, the OLED display panel in the manufacture process is required to be transferred between different devices, and the bottom surface of the bottom layer film will be inevitably rubbed against the support substrate, which is configured to supporting the bottom layer film, thus resulting in scratches to different degrees, and positions and shapes of these scratches are randomly generated. If the scratches appear in the fingerprint detection region, each fingerprint image collected by the fingerprint sensor actually includes the image of the scratches, thus causing noise and interference to the fingerprint, which may significantly affect the accuracy of fingerprint detection.

At least one embodiment of the present disclosure provides a fingerprint detection method, which includes: performing an image difference calculation on a first fingerprint image acquired by a fingerprint detection device and a foreign object correction image acquired by the fingerprint detection device to compensate foreign object information in the first fingerprint image, and to acquire a second fingerprint image; and performing the fingerprint detection by using the second fingerprint image.

At least one embodiment of the present disclosure further provides a method of acquiring a foreign object correction image of a fingerprint detection device, a texture detection device, a storage medium, an electronic device, and a fingerprint image compensation method.

A fingerprint recognition method provided by an embodiment of the present disclosure can be used for fingerprint detection of an electronic device having an under-screen fingerprint detection function to overcome the noise and interference caused by the image, which is collected and contains the foreign object, to the fingerprint detection, so that the accuracy and effectiveness of the fingerprint detection is improved.

Embodiments of the present disclosure will be described in detail below with reference to the accompanying drawings.

Figure 3:
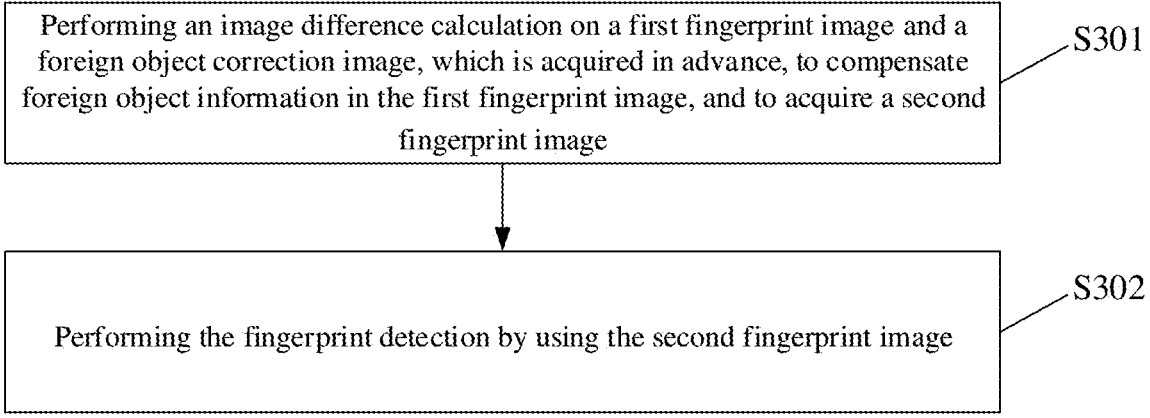
FIG. 3 is a flowchart schematic diagram of a fingerprint detection method provided by an embodiment of the present disclosure.

A fingerprint detection method is provided by an embodiment of the present disclosure, and the method is suitable for an electronic device with the fingerprint detection function. In the embodiment, the electronic device is a specific example of a fingerprint detection device, and may be an OLED display panel with the under-screen fingerprint detection function as shown in FIG. 2A and FIG. 2B. As shown in FIG. 3, the flowchart schematic diagram of the method includes following step S301 to step S302.

Step S301, performing an image difference calculation on a first fingerprint image and a foreign object correction image, which is acquired in advance, to compensate foreign object information in the first fingerprint image, and to acquire a second fingerprint image.

Step S302, performing the fingerprint detection by using the second fingerprint image.

For example, in the method of the present disclosure, the first fingerprint image refers to the fingerprint image collected by the fingerprint sensor of the fingerprint detection device, that performs fingerprint detection in the electronic device in the fingerprint detection process, and the first fingerprint image may include original image data collected by the fingerprint sensor, or the image data after further processing of the original image data. The fingerprint image includes not only the image information of the fingerprint of the user's finger, but also the image information (that is, foreign object information) of the foreign objects caused by various reasons in the electronic device during the transmission of light generating the fingerprint image of the finger. As described above, these foreign objects are, for example, scratches on the bottom surface of the display panel, adhered particles, foreign objects appearing in the functional layer, foreign objects appearing in any layer on the light transmission path or on the interface, etc. The foreign objects are located on the transmission path of the incident light detected by the fingerprint sensor (that is, light reflected from the surface of the finger), thus adversely affecting the fingerprint image collected by the fingerprint sensor. In order to reduce or eliminate the adverse effect of the foreign object information on the fingerprint detection, the present embodiment compensates this part of foreign object information by the image difference calculation. After performing of the compensation operation, the second fingerprint image is obtained from the first fingerprint image.

Then, the fingerprint detection can be performed by using the second fingerprint image. Because the second fingerprint image no longer includes the foreign object information, or the foreign object information in the second fingerprint image is alleviated, the second fingerprint image is used to perform the fingerprint detection, and therefore the effectiveness and accuracy of the fingerprint detection can be ensured.

In the compensation operation described above, a reference image or a criterion image, which is previously acquired, of the fingerprint detection region of the electronic device is used, and is further referred to as the foreign object correction image in the present embodiment. The foreign object correction image is acquired by the fingerprint sensor of the same fingerprint detection device, thus further includes the image information of the foreign object occurring in the fingerprint detection process of the electronic device (that is, the foreign object information). In addition, the foreign object correction image can be subjected to the image difference calculation with the first fingerprint image to compensate the foreign object information included in the first fingerprint image.

Because the fingerprint detection region of the electronic device is fixed, the foreign object information that is included in the first fingerprint image and obtained in the detection process and the foreign object information that is included in the foreign object correction image are consistent with each other, so that the foreign object correction image can be used for the image difference calculation to compensate the foreign object information in the first fingerprint image.

Figure 4:
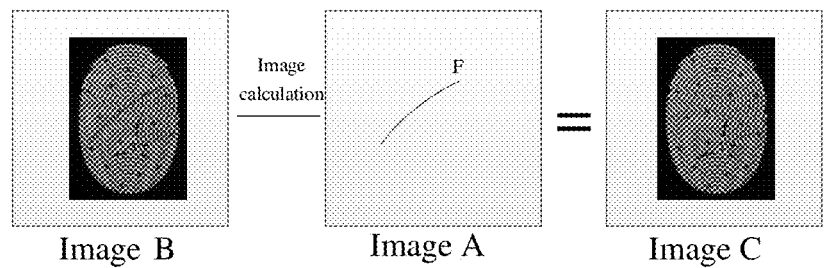
FIG. 4 is a schematic diagram of the principle of a fingerprint detection method provided by an embodiment of the present disclosure.

The principle of the fingerprint detection method in the present embodiment may refer to the schematic diagram of the example as shown in FIG. 4. As shown in FIG. 4, the image B represents a first fingerprint image, and the image A represents a foreign object correction image. In the present embodiment, the foreign object is a scratch generated on the bottom surface of the bottom layer film 205 of the display panel as shown in FIG. 2A, and accordingly, the foreign object information in the image is the information related to the scratch. As shown in FIG. 4, the foreign object correction image, represented by the image A, shows an arc-shaped scratch F, and the first fingerprint image represented by the image B further includes the arc-shaped scratch F. The image C represents a second fingerprint image, which is obtained after performing the image difference calculation on the image A and the image B. As shown in the figure, the second fingerprint image still includes the fingerprint information in the image B, but does not include the arc-shaped scratch F in the image B. Similarly, if the foreign object is of another type, the image of the foreign object may be collected as the foreign body object image in advance by the fingerprint sensor, and then the foreign object correction image are used to perform compensation operation on the first fingerprint image obtained in the subsequent fingerprint detection process to obtain a second fingerprint image, which has been compensated, and the second fingerprint image is used for subsequent fingerprint recognition and other operations.

According to the fingerprint detection method provided by the embodiments of the present disclosure, when the fingerprint detection is performed, interference caused by the image, which is collected and contains the foreign object, to the fingerprint detection can be overcome, so that the accuracy and effectiveness of the fingerprint detection are improved.

In an example, the first fingerprint image is the original fingerprint image collected by the fingerprint sensor, and then the first fingerprint image is processed. For example, the fingerprint sensor collects an original image (for example, a RGB color image) with certain color information. In this case, the image processing described above includes a grayscale processing on the first fingerprint image, and then the first fingerprint image after processing is obtained, that is, the first fingerprint image after processing is a grayscale image (referring to the image B in FIG. 4). The color of each pixel in the RGB color image is determined by three components of R, G and B. For example, the value of each component may be 0-255, so that one pixel may have a color change range of more than 16 million (255*255*255). The grayscale image is a special color image, which may have the same three components of R, G and B, and correspondingly, the variation range of one pixel is 255. Therefore, converting the color image into the grayscale image can reduce the calculation amount of the subsequent image processing. The grayscale image still reflects the distribution and characteristics of the overall and local chromaticity and brightness levels of the whole image. For example, the grayscale processing can be realized by the following two methods.

The first method is to calculate an average value of the three components of R, G and B of each pixel, and then to simultaneously assign the average value to the three components of this pixel.

The second method is based on the physical meaning of Y component in a YUV color space, which is the brightness of the pixel, that is, the value of the Y component reflects a brightness level. Then according to the change relationship between the RGB color space and the YUV color space, a corresponding relationship $Y=0.3R+0.59G+0.11B$ between the brightness Y and three color components of R, G and B can be established. The brightness value is then simultaneously assigned to the three components of this pixel.

After the grayscale processing of the first fingerprint image is performed, the image difference calculation is performed on the first fingerprint image, which is obtained, and the foreign object correction image to obtain the second fingerprint image with the foreign object information been compensated. In the present disclosure, the foreign object correction image is further a grayscale image that has been subjected to the grayscale processing (referring, for example, the image in FIG. 4). Accordingly, in order to obtain the foreign object correction image, the fingerprint sensor acquires the original image without finger touch being present, and then the grayscale processing is carried out on the original image to obtain the foreign object correction image that is also a grayscale image.

Because both the first fingerprint image and the foreign object correction image are grayscale images that have been subjected to the grayscale processing, the grayscale difference calculation may be performed on the first fingerprint image and the foreign object correction image, that is, the grayscale value of each pixel corresponding to the foreign object correction image is subtracted from the grayscale value of each pixel of the first fingerprint image, thereby eliminating foreign object information from the first fingerprint image and realizing compensation of the foreign object information in the first fingerprint image. The difference calculation is, for example, the arithmetic subtraction of the grayscale value data of each pixel corresponding to the foreign object correction image from the grayscale value data of each pixel of the first fingerprint image.

In addition, in the present embodiment, the image processing may be performed in other ways to obtain the first fingerprint image and the foreign object correction image, such as Fourier transform or wavelet transform, and the image operation between the two images may be further performed in other calculation methods, as long as the second fingerprint image, which is obtained after performing the calculation on the two images, includes alleviated foreign object information or no longer includes the foreign object information compared with respect to the first fingerprint image, thereby obtaining the second fingerprint image after the foreign object information is compensated.

In another example, performing the image processing on the first fingerprint image may further includes performing a binarization processing on the first fingerprint image that has been processed into the grayscale image. A binarized image is obtained after performing the binarization processing on the grayscale image, so that the image data no longer involves the multi-level values of pixel grayscale, which makes the subsequent processing simpler, and further reduces the processing amount and compression amount of the data. For example, the pixel with the grayscale value greater than or equal to a threshold value (for example, 100) can be replaced with 255 to represent the fingerprint information, otherwise, the grayscale value of the pixel is replaced with 0 to represent background information, thereby eliminating weaker background information. Accordingly, in the present example, the foreign object correction image is also a grayscale image that has been subjected to the grayscale processing, so that the difference operation may be performed on the grayscale value of each pixel of the first fingerprint image and the grayscale value of each pixel corresponding to the foreign object correction image, the foreign object information can be removed from the first fingerprint image, and the second fingerprint image can be obtained.

In the present embodiment, For example, after obtaining the second fingerprint image, the second fingerprint image may be further used for the fingerprint detection. For example, in an example of the present embodiment, a feature extraction is performed on the second fingerprint image to obtain a fingerprint template, and the fingerprint template is compared with a fingerprint template pre-stored in a fingerprint library to determine whether the fingerprint detection is passed.

For example, the fingerprint image corresponding to the fingerprint template that is pre-stored in the fingerprint library can also be obtained by the fingerprint detection method of the present embodiment, thus also realizing the compensation for the foreign object information therefor. Generally, if the fingerprint detection is performed according to the fingerprint image, some invariable features (such as minutia points, fingerprint types, etc.) are required to be extracted from the fingerprint image, and then these invariable features are further encoded into a standard template for storage to obtain the fingerprint template. During the detection process, the fingerprint template corresponding to the second fingerprint image is compared with the fingerprint template that has been pre-stored, the process of fingerprint comparison includes comparing minutia points in two fingerprint templates at first, and then calculating the similarity between the two fingerprint templates, so that whether the second fingerprint image is passed the fingerprint detection is determined. For example, generally, if the similarity between the two fingerprint templates exceeds a preset threshold, passing of the fingerprint detection is determined, otherwise, no passing of the fingerprint detection is determined. Alternatively, the fingerprint detection may be realized by, for example, a neural network or another method(s). The fingerprint library is stored, for example, in a predetermined storage space of the electronic device itself, for example, in an encrypted manner, or a storage server (for example, a local network server, an internet server, a cloud server, etc.), and the connection between the fingerprint library and a server is established to perform data transmission according to requirements.

For example, if the above-described fingerprint detection method is applied to some mobile communication terminal or device requiring fingerprint detection to unlock, after passing the fingerprint detection, the device can execute a preset operation. For example, a mobile phone displays a main interface, or runs an application program after passing the fingerprint detection. An access control system is switched on, after passing the fingerprint detection, thus allowing a user to enter. An automobile starting device with a fingerprint detection function stars to work, after passing the fingerprint detection.

Figure 5:
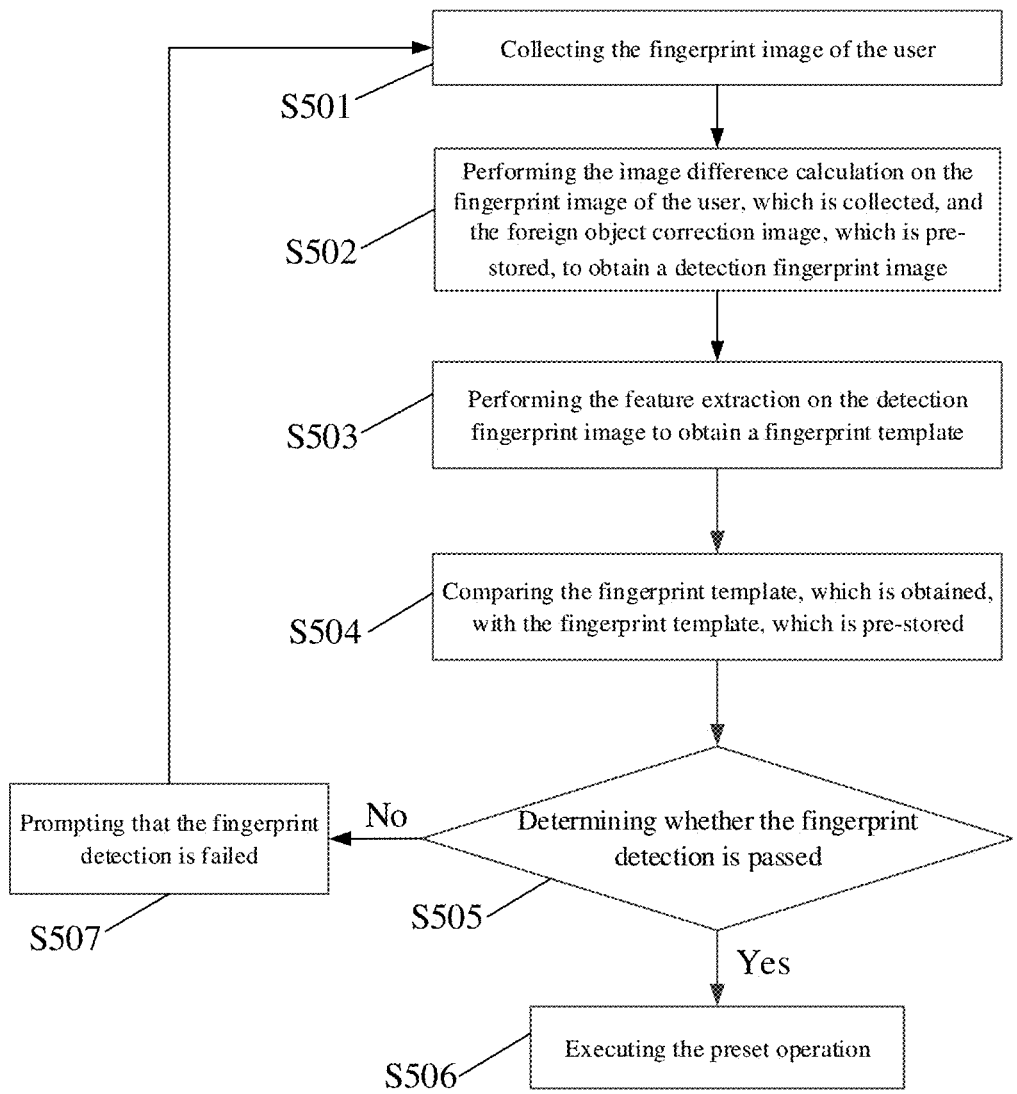
FIG. 5 is a schematic diagram of a fingerprint detection method provided by another example of an embodiment of the present disclosure.

For example, another example of the embodiment of the present disclosure provides a fingerprint detection method as shown in FIG. 5, the present embodiment provides a complete process of the fingerprint detection based on the above-described fingerprint detection method, and the complete process of the fingerprint detection includes step S501 to step S507.

Step S501, collecting a fingerprint image of a user.

Step S502, performing an image difference calculation on the fingerprint image of the user, which is collected, and a foreign object correction image, which is pre-stored, to obtain a detection fingerprint image.

Step S503, performing the feature extraction on the detection fingerprint image to obtain a fingerprint template.

Step S504, comparing the fingerprint template, which is obtained, with a fingerprint template, which is pre-stored.

Step S505, determining whether the fingerprint detection is passed, and if the fingerprint detection is passed, the process going forward to step S506, otherwise, the process going forward to step S507.

Step S506, executing a preset operation.

Step S507, prompting that the fingerprint detection is failed, the process going to step S501, and waiting for a next fingerprint detection operation.

For example, in step S501, the fingerprint image (the first fingerprint image) of the finger used in the user's operation is collected, for example, by the fingerprint sensor of the electronic device as shown in FIG. 2A and FIG. 2B. The initial image collected by the fingerprint sensor can be pre-processed to remove or reduce noise in the initial image, and the fingerprint information can be correspondingly enhanced to obtain a pre-processed fingerprint image of the user. The pre-processing may include, for example, median filtering, sharpening filtering or other methods, which can achieve contrast enhancement.

For example, a detection fingerprint image (the second fingerprint image), which has been compensated for the foreign object in the electronic device, is obtained, by performing the image difference calculation on the fingerprint image of the user and the pre-stored foreign object correction image. For example, when the image difference calculation is performed on the fingerprint image of the user, the grayscale processing is performed on the fingerprint image of the user at first, and then the image difference calculation is performed on the fingerprint image of the user and the foreign object correction image, which is also subjected to the same grayscale processing, or the grayscale processing and a binarization processing are performed on the fingerprint image of the user, then the image difference calculation is performed on the fingerprint image of the user and the foreign object correction image, which is also subjected to the same grayscale processing and the same binarization processing, to obtain the detection fingerprint image which has been compensated.

For example, after obtaining the detection fingerprint image which has been compensated, the feature extraction can be performed by using the detection fingerprint image to extract fingerprint invariant features, such as minutia points, fingerprint types, etc. The minutia points, which are extracted, are a set of points, each point of which has a local ridge direction corresponding a minutia point, and these features can be further encoded into a standard template file for storage. A fingerprint feature template standard may be ISO/IEC 19794-2 standard, ANSI/NIST-ITL 1 standard, or another standard, and the standard of the fingerprint template to be compared subsequently is required to be consistent with the standard of the detection fingerprint image.

For example, after obtaining the fingerprint template of the detection fingerprint image, the fingerprint template of the detection fingerprint image is compared with a pre-stored fingerprint template. For example, in the process of fingerprint comparison, firstly, a minutia point matching is performed, that is, a corresponding relationship between the minutia points of the fingerprint template, which is detected, and the minutia points of the fingerprint template, which is pre-stored, is searched. The minutia points may include abrupt positions of ridge lines of the fingerprint, such as endpoints, bifurcation points, loop points, isolated points, short lines, etc. For example, endpoints, bifurcation points or composite features (triple bifurcation points or intersection points) of the ridge lines can further be selected as the minutia points of the fingerprint. Fingerprint minutia point matching is a key part of fingerprint recognition. After performing the minutia point matching, then, the similarity of the fingerprint template, which is detected, to the fingerprint template, which is pre-stored, is calculated according to the corresponding relationship of the minutia points. If the similarity exceeds a preset threshold, the two fingerprints are determined to be the same, otherwise, the two fingerprints are determined to be different.

Based on the result of the fingerprint comparison, whether the fingerprint detection of the user is passed is determined. If the fingerprint detection is passed, the corresponding operation is executed. If the fingerprint detection is failed, it is prompted that the fingerprint detection is failed. For example, under this case, the user may be reminded to perform the fingerprint detection again. For example, the prompting method may be carried out by directly displaying through a display device (such as an OLED display screen), or the result may be notified through a voice output device (such as a speaker), or the result may be prompted through vibration.

The fingerprint detection method of the above embodiments, may further include, for example, a living body detection step, etc. if required. In order to realize the living body detection in the fingerprint detection process, for example, an infrared image sensor may be used for such detection. In addition to using the infrared image sensor to realize fingerprint collection by a fingerprint image, the infrared image sensor may further be used for a temperature detection. If it is detected that the temperature of the detected target is substantially the same as the normal human body temperature, the living body detection is passed, otherwise, for example, the detection is interrupted, and the prompt information (for example, the warning information) is shown.

Accordingly, at least one embodiment of the present disclosure provides a fingerprint image compensation method (or a fingerprint image acquisition method), which includes that: performing image difference calculation on a first fingerprint image acquired by a fingerprint detection device and the foreign object correction image acquired by the fingerprint detection device to compensate the foreign object information in the first fingerprint image, to acquire the second fingerprint image. The fingerprint image compensation method can be used for a fingerprint registration or the fingerprint detection. In the case of a fingerprint registration process, the acquired second fingerprint image can be stored in the fingerprint library for comparison in the fingerprint detection in the future. In the case of a fingerprint detection process, the acquired second fingerprint image is configured to compare with the fingerprint image stored in the fingerprint library to determine whether authentication is passed.

Figure 6:
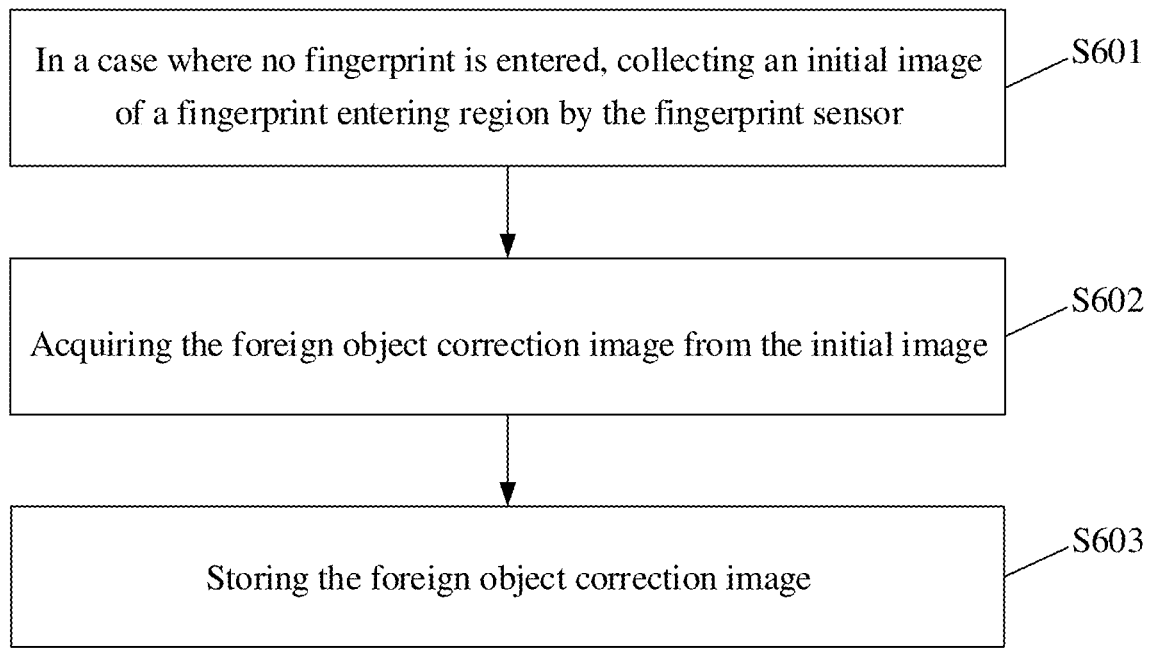
FIG. 6 is flowchart schematic diagram of a method of acquiring a foreign object correction image provided by another embodiment of the present disclosure.

Another embodiment of the present disclosure provides a method of acquiring a foreign object correction image for the above-described fingerprint detection method. The method may be applied to the case of the electronic device as shown in FIG. 2A and FIG. 2B, the fingerprint detection device of the electronic device incudes a fingerprint sensor, and a flowchart schematic diagram of the method is shown in FIG. 6, and includes step S601 to step S603.

Step S601, in a case where no fingerprint is entered, collecting an initial image of a fingerprint entering region by a fingerprint sensor.

Step S602, acquiring a foreign object correction image from the initial image.

Step S603, storing the foreign object correction image.

Before performing the fingerprint detection, the foreign object correction image is acquired in advance so as to later compensate, in the fingerprint detection process, the foreign object information appearing in the fingerprint detection process of the electronic device, and the accuracy in the fingerprint detection is improved. If no user's finger touches the fingerprint detection region of the electronic device, that is, no fingerprint detection is performed, the fingerprint sensor collects, for example, the initial image formed by the reflected light of the surface of the display panel itself, and the initial image includes foreign object information without any fingerprint information, or may further include other background information. In order to better acquire the initial image, a reflective film may be attached to the surface of the display panel, for example, to increase the reflected light on the surface of the display panel. For example, the reflection film can simulate the reflection characteristics of human skin (for example, reflectivity, color, texture, etc.), so that the environment to obtain the foreign object correction image is closer to the environment where a fingerprint image is actually collected, and a better foreign object information compensation effect is obtained.

For example, after acquiring the initial image, for more effective fingerprint detection, the image may further be pre-processed. The pre-processing can remove or reduce noise in the initial image, and correspondingly enhance the foreign object information. The pre-processing may include, for example, median filtering, sharpening filtering or another method, which can achieve contrast enhancement.

In addition, based on a subsequent processing of the fingerprint image in the fingerprint detection process, such as a grayscale processing, a binarization processing, etc., the foreign object correction image can be further correspondingly subjected to the grayscale processing, the binarization processing, etc., so that the image difference calculation is performed on the foreign object correction image and the first fingerprint image obtained in the fingerprint detection process.

For example, after performing the pre-processing, which is described above, on the obtained foreign object correction image, the foreign object correction image is stored for convenience in any subsequent fingerprint detection. The method of the present embodiment can be applied to a different kind of electronic device, which includes a memory and a processor, such as a mobile phone, a computer, etc. Therefore, the foreign object correction image can be stored in a designated storage device or a predetermined region of the storage device, such as a ROM (Read Only Memory) of the mobile phone, a hard disk of the computer, etc. The present embodiment is not specifically limited to the above examples.

The method of acquiring a foreign object correction image of a fingerprint detection device, provided by the present disclosure, can acquire the foreign object correction image in advance, and store the foreign object correction image for a subsequent fingerprint detection. For example, the method of acquiring a foreign object correction image of a fingerprint detection device can be performed when the product leaves the factory, or when the product is used, so that the foreign object correction image can be adjusted according to the actual situation during the usage of the product.

Figure 7:
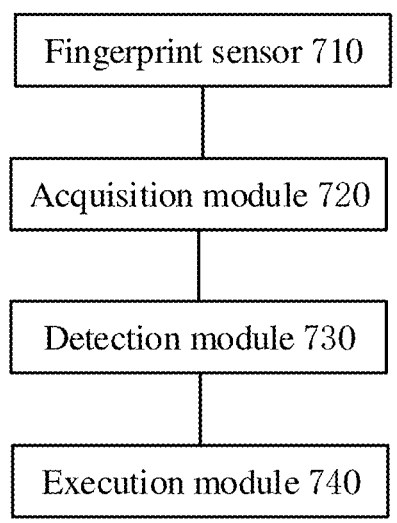
FIG. 7 is a structural schematic diagram of a fingerprint detection device provided by another embodiment of the present disclosure.

A fingerprint detection device is provided by another embodiment of the present disclosure, and a structural schematic diagram of the fingerprint detection device 700 in the present embodiment is shown in FIG. 7. The fingerprint detection device 700 includes: a fingerprint sensor 710, configured to collect a fingerprint image; an acquisition module 720, configured to perform an image difference calculation on a first fingerprint image acquired by the fingerprint sensor 710 and a foreign object correction image acquired by the fingerprint sensor 710 to compensate foreign object information in the first fingerprint image, and acquire a second fingerprint image; a detection module 730, coupled with the acquisition module 720, and configured to perform a fingerprint detection on the second fingerprint image.

For example, step S301 may be implemented by the acquisition module 720, and the acquisition module 720 may be implemented by a hardware, a software, etc., for example, may be implemented by a circuit or a computer program. For example, step S302 may be implemented by the detection module 730, and the detection module 730 may be implemented by a hardware, a software, etc., for example, may be implemented by a circuit or a computer program.

For example, the fingerprint detection device of the present embodiment may further include an execution module 740, which is coupled with the detection module 730, and the execution module 740 is configured to execute a preset operation after passing the fingerprint detection. Similarly, the execution module 740 may be implemented by a hardware, a software, etc., for example, may be implemented by a circuit or a computer program.

According to the fingerprint detection device provided by the embodiment of the disclosure, when the fingerprint detection is performed, interference caused by the image, which is collected and contains a foreign object, to the fingerprint detection can be overcome, so that the accuracy and effectiveness of the fingerprint detection are improved.

It should be noted that in the embodiments of the present disclosure, more or fewer modules may be included, and the connection relationship between the modules is not limited, and may be determined according to actual requirements. The specific configuration of each module is not limited, and can be formed of analog devices, or formed of digital devices, or formed in other suitable means according to a module principle.

Figure 8:
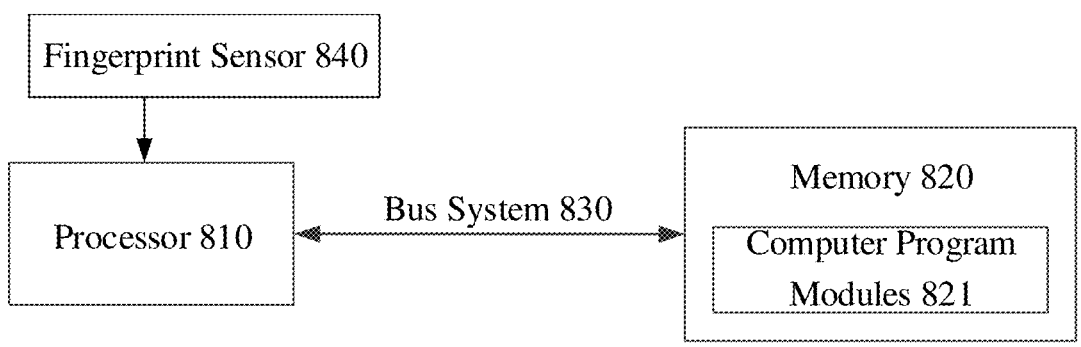
FIG. 8 is a structural schematic diagram of another fingerprint detection device provided by another embodiment of the present disclosure.

A fingerprint detection device is provided by another embodiment of the present disclosure, a structural schematic diagram of the fingerprint detection device is shown in FIG. 8, and the fingerprint detection device includes: a fingerprint sensor 840, a processor 810, a memory 820, and a bus system 830.

For example, the fingerprint sensor 840 is configured to collect the fingerprint image, and is connected to the processor 810. The processor 810 is connected to the memory 820 through the bus system 830. For example, one or more computer program modules 821 may be stored in the memory 820. For example, the one or more computer program modules 821 include instructions to perform the fingerprint detection method provided by any embodiment of the present disclosure, and when the instructions are loaded and executed by the processor 810, effective and accurate fingerprint detection of the fingerprint image, which includes foreign object information, is realized. The one or more computer program modules 821 may further include instructions to perform the method of acquiring a foreign object correction image of a fingerprint detection device provided by any embodiment of the present disclosure, and when the instructions are loaded and executed by the processor 810, the foreign object correction image may be acquired before the fingerprint detection.

For example, in the above-described fingerprint detection device, the memory 820 may be configured to store the foreign object correction image, which is acquired.

For example, the bus system 830 may be a common serial bus or a parallel communication bus, and the embodiments of the present disclosure are not limited thereto.

In various embodiments of the present disclosure, any processor may be implemented by a dedicated integrated circuit chip, for example, the dedicated integrated circuit chip may be arranged on a motherboard, and for example, a memory, a power supply circuit, etc., may further be arranged on the motherboard. The processor may further be implemented by a circuit or by adopting a software, a hardware (circuit), a firmware, or any combination thereof. In the embodiments of the present disclosure, the processor may include various computing structures, such as a complex instruction set computer (CISC) structure, a reduced instruction set computer (RISC) structure, or a structure implementing a combination of multiple instruction set combinations. In some embodiments, the processor may further be a microprocessor, such as an X86 processor or an ARM processor, or may be a digital processor (DSP), etc.

In the embodiments of the present disclosure, the memory may be, for example, arranged on the above motherboard, and the memory may store instructions and/or data executed by the processor. For example, the memory may include one or more computer program products, which may include various forms of computer readable memory, such as a volatile memory and/or a nonvolatile memory. The volatile memory may include, for example, a random access memory (RAM) and/or a cache, etc. The nonvolatile memory may include, for example, a read only memory (ROM), a hard disk, a flash memory, etc. One or more computer program instructions may be stored on the computer readable memory, and the processor may execute the program instructions to implement desired functions (implemented by the processor) in embodiments of the present disclosure.

An embodiment of the present disclosure further provides a storage medium, which is configured to store computer-executable instructions. When the computer-executable instructions are executed by a computer, the fingerprint image compensation method provided by any embodiment of the present disclosure can be executed, the fingerprint detection method provided by any embodiment of the present disclosure can be executed, or the method of acquiring the foreign object correction image of the fingerprint detection device provided by any embodiment of the present disclosure can further be executed.

For example, the storage medium may be any combination of one or more computer-readable storage mediums, for example, one computer-readable storage medium contains computer-readable program code for performing an image difference operation on the first fingerprint image and the foreign object correction image, and the other computer-readable storage medium contains computer-readable program code for performing fingerprint detection using the second fingerprint image. For example, when the program code is read by a computer, the computer may execute the program code stored in the computer storage medium to execute, for example, the fingerprint detection method provided by any embodiment of the present disclosure.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the above storage media, or may be other suitable storage media.

An embodiment of the present disclosure further provide an electronic device with a fingerprint detection function, which includes the fingerprint detection device in the above embodiments to acquire the fingerprint image, which has been compensated for the foreign object information, to realize more effective and accurate fingerprint detection, or to obtain foreign object correction image before fingerprint detection.

For example, the electronic device in the present embodiment may be a display device, which may include a display panel and a fingerprint sensor. The display panel may be an OLED display panel (for example, a flexible OLED display panel). The display panel may further be another type of display panel, such as a liquid crystal display panel, an electronic paper display panel, etc. For example, a light source for realizing fingerprint detection may be otherwise added to the display panel. The fingerprint sensor may be a different kind of optical fingerprint sensor, or may be another appropriate type of fingerprint sensor.

For example, the display panel includes a display region, which includes a fingerprint detection region. Moreover, in order not to affect the normal display of the display pane, the fingerprint senor is provided at a non-display side of the display panel, and overlaps with the fingerprint detection region in a direction perpendicular to the display panel, for which reference may be made to the cases as shown in FIG. 2A and FIG. 2B.

What are described above is related to the specific embodiments of the present disclosure only. The protection scope of the present disclosure should be subject to the protection scope defined by the claims.

What is claimed is:

1. A texture image compensation method, comprising:
performing an image difference calculation on a first texture image acquired by a fingerprint detection device and a foreign object correction image acquired by the fingerprint detection device to compensate foreign object information in the first texture image, and to acquire a second texture image; wherein performing the image difference calculation on the first texture image and the foreign object correction image, comprises:
performing a binarization processing on the first texture image after performing a grayscale processing on the first texture image, wherein the foreign object correction image has been subjected to the grayscale processing and the binarization processing;
performing the image difference calculation on the first texture image and the foreign object correction image that both have been subjected to the grayscale processing and the binarization processing; and
wherein the foreign object correction image is a reference image for the fingerprint detection region obtained in advance before the fingerprint detection device performs fingerprint detection.

2. The method according to claim 1, wherein an acquisition method of the foreign object correction image, comprises:
in a case where no texture is entered, colleting an initial image of a texture entering region; and
acquiring the foreign object correction image from the initial image, wherein the foreign object correction image comprises the foreign object information of the texture entering region.

3. The method according to claim 1, after acquiring the foreign object correction image, further comprising:
storing the foreign object correction image.

4. The method according to claim 1, wherein the foreign object information comprises scratch information.

5. The method according to claim 1, wherein the first texture image comprises a fingerprint image.

6. A texture detection method, comprising:
acquiring the second texture image by the method according to claim 1; and
performing a texture detection by using the second texture image.

7. The method according to claim 6, wherein performing the texture detection by using the second texture image, comprises:
performing a feature extraction on the second texture image to acquire a texture template, and comparing the texture template with a pre-stored texture template in a texture library to determine whether the texture detection is passed.

8. The method according to claim 6, further comprising:
after passing the texture detection, a preset operation is allowed to be executed.

9. A texture detection device, comprising:
a texture sensor, configured to collect a texture image; and
an acquisition module, configured to perform an image difference calculation on a first texture image acquired by the texture sensor and a foreign object correction image acquired by the texture sensor to compensate foreign object information in the first texture image, and to acquire a second texture image;
wherein the first texture image has been subjected to a grayscale processing and a binarization processing, and the foreign object correction image has been subjected to the grayscale processing and the binarization processing; and
wherein the foreign object correction image is a reference image for the fingerprint detection region obtained in advance before the fingerprint detection device performs fingerprint detection.

10. The texture detection device according to claim 9, further comprising:
a detection module, configured to perform a texture detection on the second texture image.

11. A texture detection device, comprising:
a texture sensor, configured to collect a texture image;
a processor; and
a memory, in which computer-executable instructions are stored,
wherein in a case where the computer-executable instructions are loaded and executed by the processor, the processor executes the texture image compensation method according to claim 1.

12. The texture detection device according to claim 11, wherein the memory further stores a foreign object correction image.

13. An electronic device, comprising:
the texture detection device according to claim 9.

14. The electronic device according to claim 13, wherein the electronic device is a display device, and comprises a display panel,
the display panel comprises a display region, and the display region comprises a texture detection region,
the texture senor is provided at a non-display side of the display panel, and overlaps with the texture detection region in a direction perpendicular to the display panel.

* * * * *